(12) United States Patent
Wackerly

(10) Patent No.: US 7,796,613 B2
(45) Date of Patent: Sep. 14, 2010

(54) DETECTION OF MISMATCHED VLAN TAGS

(75) Inventor: Shaun C. Wackerly, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 11/590,309

(22) Filed: Oct. 31, 2006

(65) Prior Publication Data

US 2008/0101380 A1   May 1, 2008

(51) Int. Cl.
*H04L 12/28* (2006.01)
*H04L 12/56* (2006.01)

(52) U.S. Cl. .................. 370/395.53; 370/389; 370/392

(58) Field of Classification Search ............. 370/395.53
See application file for complete search history.

(56) References Cited

U.S. PATENT DOCUMENTS

| | | | | |
|---|---|---|---|---|
| 6,181,702 | B1 * | 1/2001 | Egbert | 370/401 |
| 6,445,715 | B1 | 9/2002 | Annaamalai et al. | |
| 6,775,283 | B1 | 8/2004 | Williams | |
| 2002/0085553 | A1 * | 7/2002 | Ku et al. | 370/389 |
| 2002/0146026 | A1 * | 10/2002 | Unitt et al. | 370/428 |
| 2006/0126616 | A1 * | 6/2006 | Bhatia | 370/389 |
| 2007/0097972 | A1 * | 5/2007 | Jain et al. | 370/392 |
| 2007/0280266 | A1 * | 12/2007 | Chao et al. | 370/395.53 |

OTHER PUBLICATIONS

IEEE Standard 802.3ac-1998, Supplement to Carrier Sense Multiple Access with Collision Detection (CSMA/CD) Access Method and Physical Layer Specifications-Frame Extensions for Virtual Bridged Local Area Network (VLAN) Tagging on 802.3 Networks, 1998, Institute of Electrical and Electronics Engineers.*
IEEE Standard 802.1Q-1998, IEEE Standards for Local and Metropolitan Area Networks: Virtual Bridged Local Area Networks, 1999, Institute of Electrical and Electronics Engineers.*

* cited by examiner

*Primary Examiner*—William Trost, IV
*Assistant Examiner*—Andrew Chriss

(57) ABSTRACT

A network device, system and method are provided for detection of mismatched VLAN tags on a port of a network chip and a packet. The network device includes a processor, a memory and a network chip having a number of network ports. One of the ports is tagged with a VLAN membership of at least one particular VLAN and configured to receive a packet. Computer executable instructions are storable in the memory and executable by the processor to detect whether the packet received at the port is untagged with any VLAN. Upon detecting that the packet is untagged with any VLAN, the computer executable instructions determine whether the untagged packet is intended to be untagged on the particular VLAN at the port. If the packet is not intended to be untagged on the particular VLAN at the port, the computer executable instructions send a misconfiguration alert signal to a network management program, and determine either the packet is misconfigured to be sent to the network chip without a VLAN tag or the port of the network chip is misconfigured to be tagged with the particular VLAN.

17 Claims, 4 Drawing Sheets

DETECTION OF MISMATCHED VLAN TAGS

BACKGROUND

Computing networks can include multiple network devices such as routers, switches, hubs, servers, desktop PCs, laptops, and workstations, among other peripheral devices, e.g., printers, facsimile devices, and scanners, networked together across a local area network (LAN) and/or wide area network (WAN).

In addition to physical connections, networks often form virtual, e.g., logical connections. A virtual LAN (VLAN) is a logical subgroup within a LAN that is created via software rather than manually moving cables in the wiring closet. It combines user stations and network devices into a single unit regardless of the physical LAN segment to which they are attached and allows traffic to flow more efficiently within populations of mutual interest.

VLANs are implemented in port switching hubs and LAN switches and generally offer proprietary solutions. VLANs reduce the time it takes to implement connection moves, additions and changes. VLANs function at layer 2 of the open system interconnection (OSI) protocol stack. The OSI protocol stack is one example of the set of protocols used in a communications network. A protocol stack is a prescribed hierarchy of software layers, starting from the application layer at the top (the source of the data being sent) to the physical layer at the bottom (transmitting the bits on the wire). The stack resides in each client and server, and the layered approach lets different protocols be swapped in and out to accommodate different network architectures. Layer 2 is the data link layer. Layer 2 is responsible for node to node validity and integrity of the transmission. The transmitted bits are divided into frames; for example, an Ethernet, Token Ring or FDDI frame in local area networks (LANs).

VLAN tagging is used to divide physical ports (P) on a switching device into a set of virtual groups (V), where each group is called a VLAN. In each VLAN, a port is either tagged or untagged. Taggedness of a port determines whether additional information needs to be prepended to the port before sending data out of that port. A single port may be a member of multiple VLANs, but may only be marked untagged in one VLAN.

One issue with VLAN tagging is when any discrepancies arise between the configuration of the switch and the physical orientation of links, e.g., physical (Layer 1) connections, to ports on other switches. If, for example, a port P1 on switch S1 is configured to be tagged on VLANs V1 and V2 and untagged on VLAN V3, then this configuration is only useful when P1 is properly linked to another switch (S2) with V1, V2, and V3 configured identically. If one of the following two instances arise, then the network connection may be faulty: (1) the link is not plugged in to port P1, but is mistakenly plugged into some other port, e.g., P2 on S1; (2) the link is properly plugged in, but the configuration of S2 does not match the configuration of S1. In these two cases, it is up to the network administrator to detect the problem, locate the root cause, and provide a remedy.

DETAILED DESCRIPTION

According to various embodiments network devices, systems and methods are provided, including executable instructions for error detection of mismatched VLAN tag. One embodiment includes a network device having a processor in communication with a memory and a network chip having a number of network ports. Computer executable instructions are storable in the memory and executable by the processor to detect when a port on the device is misconfigured and send an alert signal.

According to various embodiments, network chips (e.g., application specific integrated circuits (ASICs)) include a number of network ports and logic associated with the device for the purpose of exchanging packets with the processor responsible for processing the packets. In effect, the ports to a network chip operate at the layer 2/layer 1 levels of the protocol stack, e.g., logic link control/media access control-physical layers (MAC-PHY) and includes logic circuitry associated therewith to achieve the embodiments described herein.

According to various embodiments, computer executable instructions can execute to receive a packet on the port of the device and detect that it has a VLAN tag for which the port has not been configured. The number of network ports can include a number of ports tagged for a VLAN membership in particular VLANs, wherein a given port may be tagged on a number of VLANs, but untagged on only one VLAN. The device can include instructions on the network chip, e.g., provided with hardware as part of an application specific integrated circuit (ASIC), that can execute so as not to discard a packet received to a port of the network chip which has a VLAN tag associated with a VLAN for which the port is not tagged with VLAN membership.

Figure 1:
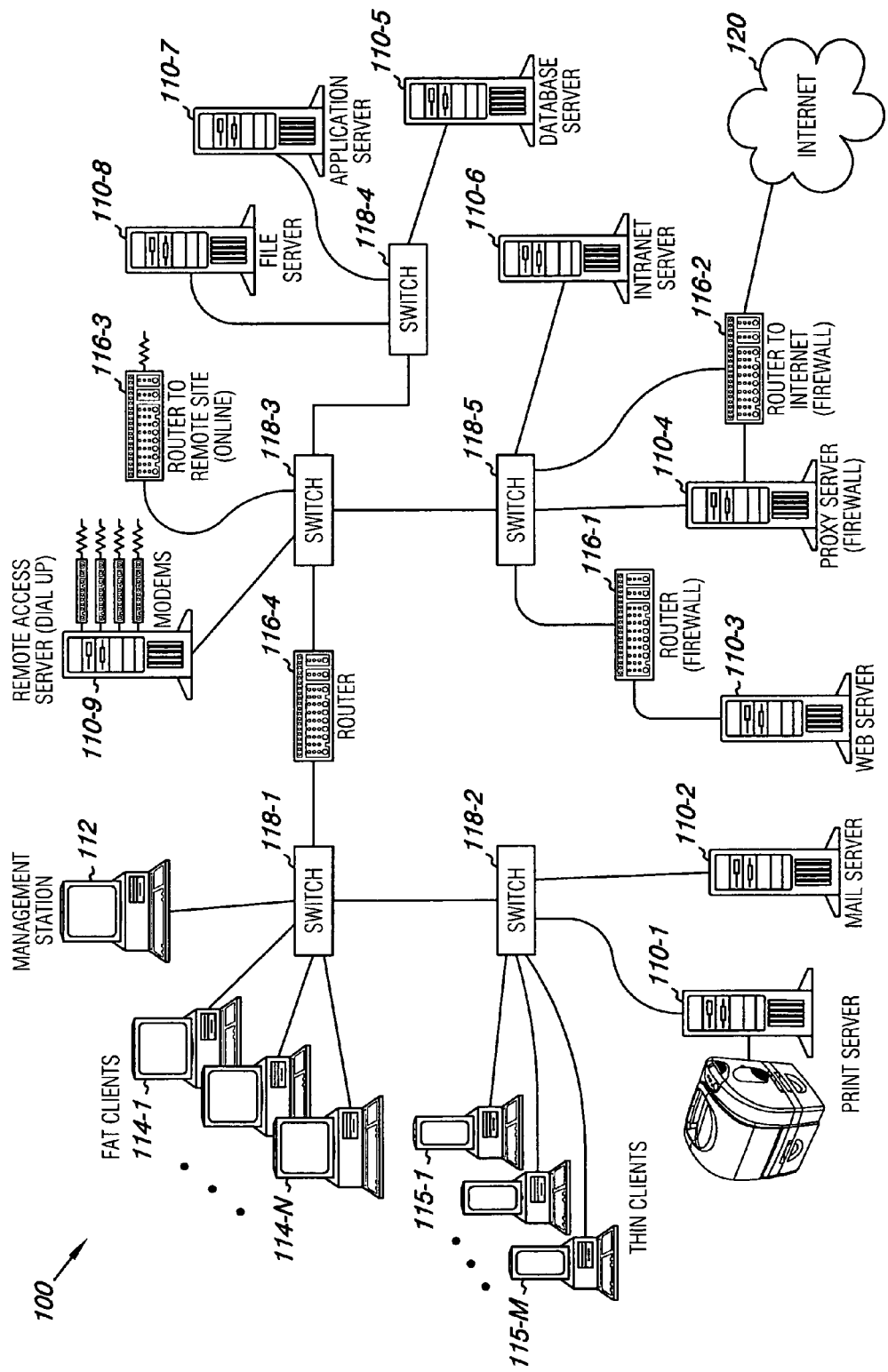
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like (referred to herein as "network devices"). The embodiment of FIG. 1 illustrates clients and servers in a LAN. However, embodiments of the invention are not so limited. For example, the embodiment of FIG. 1 shows various servers for various types of service on a LAN.

The exemplary network of FIG. 1 illustrates a print server 110-1, a mail server 110-2, a web server 110-3, a proxy server (firewall) 110-4, a database server 110-5, and intranet server 110-6, an application server 110-7, a file server 110-8, and a remote access server (dial up) 110-9. Again, the examples provided here do not provide an exhaustive list. The embodiment of FIG. 1 further illustrates a network management server 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5. Embodiments of the invention, however, are not limited to the number and/or type of network devices in FIG. 1's illustration.

As one of ordinary skill in the art will appreciate, many of these devices include processor and memory hardware. By way of example and not by way of limitation, the network management server 112 will include a processor and memory. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type, or size of processor and memory resources.

Computer executable instructions (e.g., computer executable instructions), as described in more detail below, can reside on the various network devices. For example, computer executable instructions in the form of firmware, software, etc., can be resident on the network 100 in the memory of a network management server 112 and/or one or more routers, 116-1, 116-2, 116-3, and 116-4, and hubs and/or switches 118-1, 118-2, 118-3, 118-4, and 118-5, and be executable by the processor(s) thereon. As the reader will appreciate, computer executable instructions can be resident in a number of locations on various network devices in the network 100 as employed in a distributed computing network.

As one of ordinary skill in the art will appreciate, each network device in the network is associated with a port of a switch to which it is connected. Data frames, or packets, are transferred between network devices by means of a switch's logic link control (LLC)/media access control (MAC) circuitry, or "engines", associated with each switch port. The network switch passes data frames received from a transmitting network device to a destination network device based on the header information in the received data frame. The switch can also link a given network to other networks through one or more pre-designated switch ports.

Figure 2:
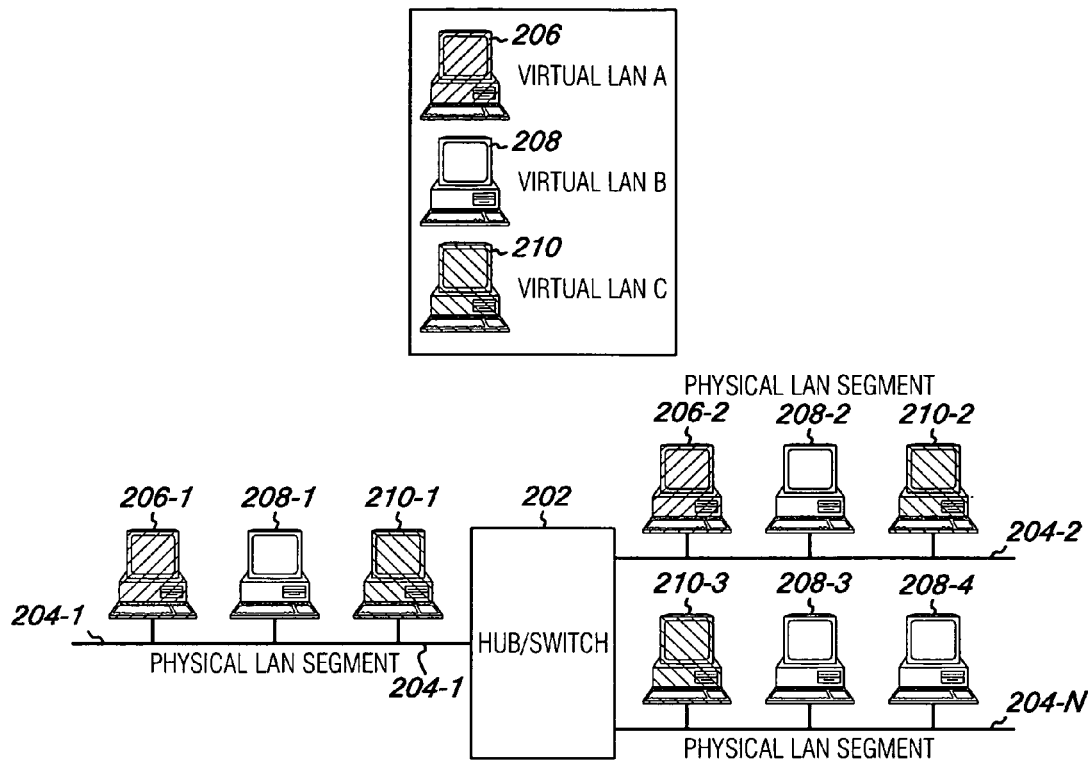
FIG. 2 is an illustration showing various VLAN logical subgroups relative to various physical LAN segments to which multiple network devices are attached.

FIG. 2 is an illustration showing various VLAN logical subgroups, e.g., virtual LAN A 206, virtual LAN B 208, virtual LAN C 210, relative to various physical LAN segments, e.g., 204-1, 204-2, . . . , 204-N, to which multiple network devices, e.g., 206-1, 206-2, 208-1, 208-2, 208-3, 208-4, 210-1, 210-2, 210-3, are attached. One feature of packet switches, e.g., 202, used in LAN applications, such as Ethernet switches, is that the switches 202 actually can segregate a network into a number of virtual local area networks (VLANs), e.g., virtual LAN A 206, virtual LAN B 208, virtual LAN C 210. In the VLAN mode of operation, the switches, e.g., 202, of a packet network transport frames or packets back and forth between network devices, e.g., 206-1, 206-2, 208-1, 208-2, 208-3, 208-4, 210-1, 210-2, 210-3, designated as members of a particular VLAN, e.g., virtual LAN A 206, virtual LAN B 208, virtual LAN C 210. The switches, e.g., switch 202, of the network do not transport the packets for the VLAN members, e.g., virtual LAN A 206, virtual LAN B 208, virtual LAN C 210, to other network devices, e.g., 206-1, 206-2, 208-1, 208-2, 208-3, 208-4, 210-1, 210-2, 210-3 not belonging to that particular LAN. In other words, switch 202 will transport packets for VLAN A member 206 to network devices 206-1, and 206-2, but not others. Switch 202 will transport packets for VLAN B 208 to network devices 208-2, 208-2, 208-3, and 208-4, but not others. And, switch 202 will transport packets for VLAN C 201 to network devices 210-1, 210-2, and 210-3, but not others.

In this manner, the capability exists for creating logical workgroups of users and their shared resources (servers, printers, etc.), which may be physically separated from each other. Members of a workgroup may be coupled directly with one switch in the LAN, while other members or equipment of the workgroup may be coupled to one or more remote networks that are linked to the switch at a designated port. VLAN groupings, e.g., virtual LAN A 206, virtual LAN B 208, virtual LAN C 210, can provide privacy and security to their members while enabling "broadcast domains" whereby broadcast traffic is kept "inside the VLAN, e.g., virtual LAN A 206, virtual LAN B 208, virtual LAN C 210.

As the reader will appreciate, where a given switch, e.g., 202, implements two or more VLANs, e.g., virtual LAN A 206, virtual LAN B 208, virtual LAN C 210, the switch, e.g., 202 has to distinguish packets for members of one VLAN from packets for members of a different VLAN and from packets for devices not associated with any one VLAN. All VLAN frames may be tagged with data identifying the particular VLANS. Hence, data packets communicating within a VLAN, e.g., virtual LAN A 206, virtual LAN B 208, virtual LAN C 210, may contain information that identifies the VLAN grouping, or VLAN type, and the particular VLAN ID. Such information, or "tag," is provided as additional fields in the frame header. The frame format for such packets is expanded relative to the standard frame format. For example, the IEEE 802.3ac-1998 supplement to the Ethernet ANSI/IEEE 802.3 standard (1998 Edition) specifies the tagged and untagged frame formats, and the P802.1Q Draft standard specifies the semantics of tagged frames. As the reader will appreciate, according to these formats a port may tagged on a number of VLANs, but untagged on only one VLAN.

In some network implementations, all of the devices including the destination network devices of the network may process VLAN tags. However, in many cases, the destination network devices on the network do not process VLAN tags. Where all legs of the VLAN are served through one switch, the switch may distinguish the packets simply by receiving and sending packets over the links designated for the respective VLAN, without VLAN tags. However, where the VLANs extend through two or more switches, the frames or packets for each VLAN must be tagged, particularly on the links between switches. One of ordinary skill in the art will appreciate the manner in which computer executable instructions stored in a memory of a switch can be executed by processor resources of the switch to establish VLANS and tags as described in connection with FIG. 2.

As one of ordinary skill the art will understand, embodiments of the present disclosure can be performed by software, application modules, and computer executable instructions, stored in memory and executable by processor resources, on the systems and devices shown herein or otherwise. The embodiments, however, are not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

Figure 3:
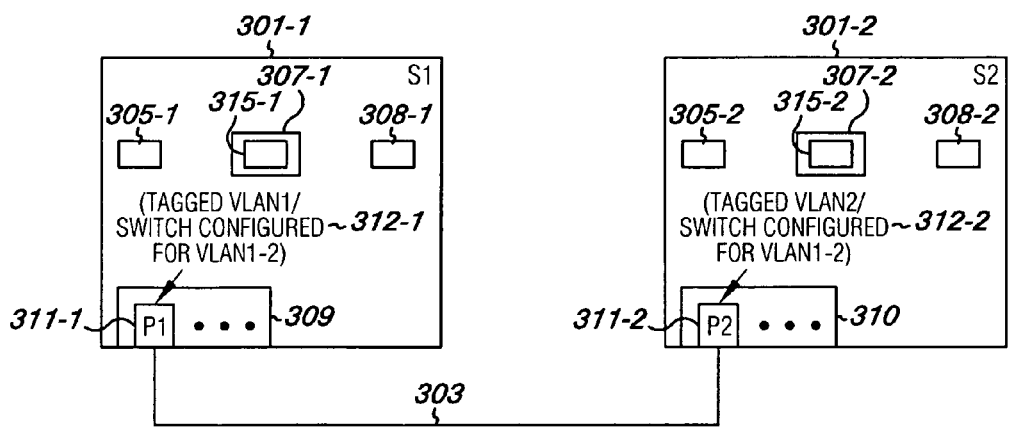
FIG. 3 illustrates an embodiment for detection of mismatched VLAN tags according to this disclosure.
Figure 4:
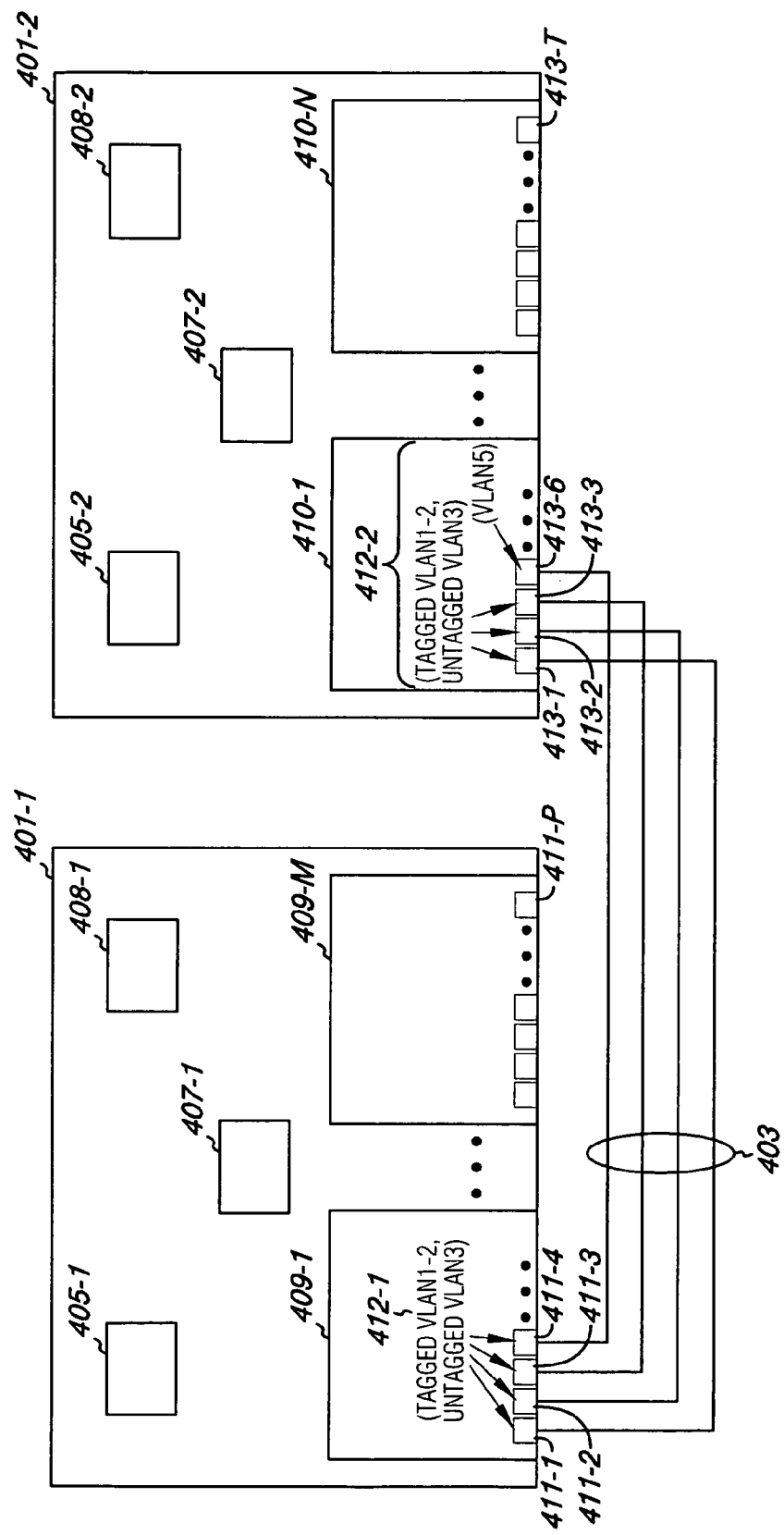
FIG. 4 illustrates another embodiment for detection of mismatched VLAN tags according to this disclosure.
Figure 5:
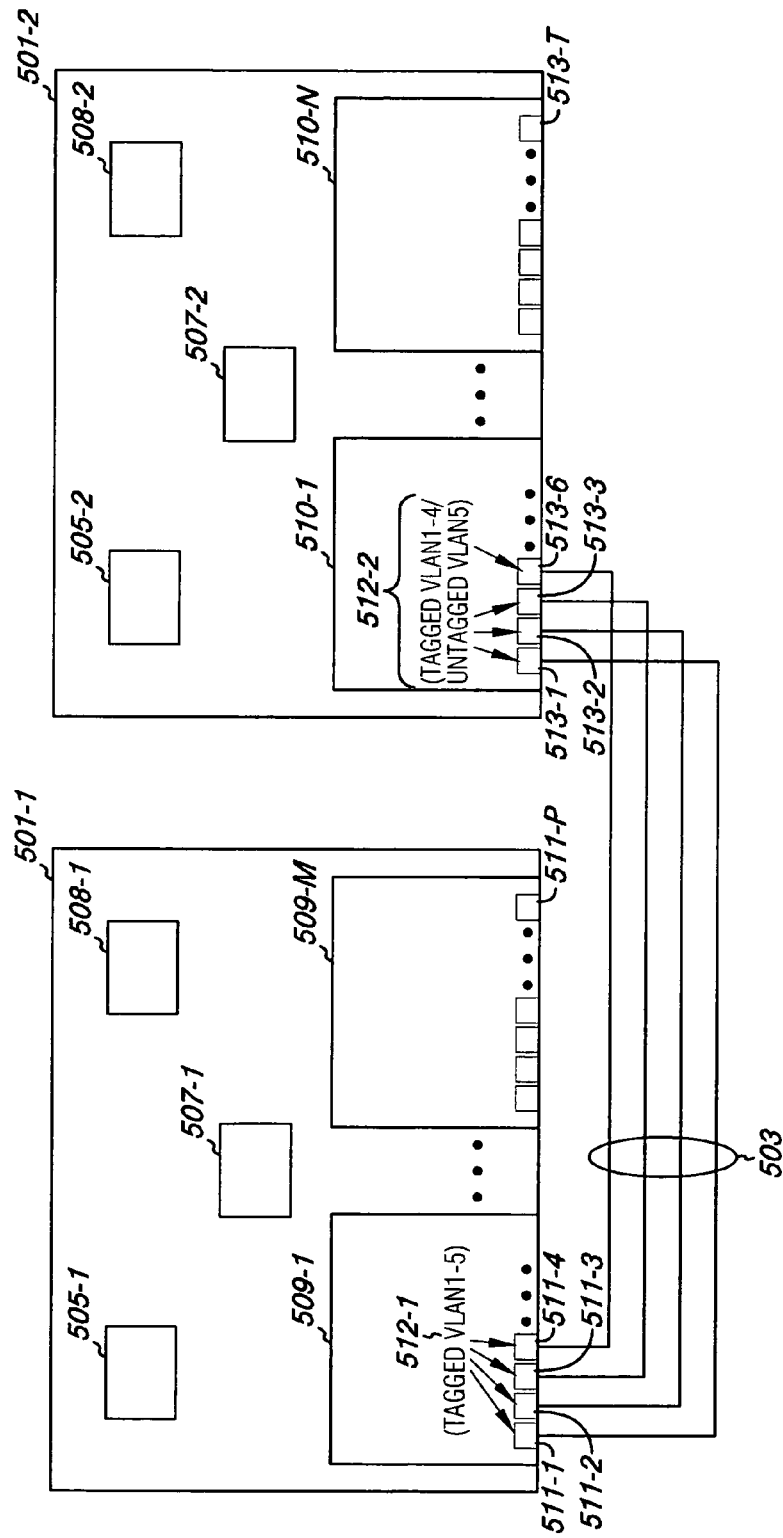
FIG. 5 illustrates another embodiment for detection of mismatched VLAN tags according to this disclosure.

FIG. 3 illustrates an embodiment of error detection on mismatched VLAN tags. The embodiment of FIG. 3 illustrates a pair of switches (S1 and S2), 301-1 and 301-2, respectively, connected via a physical link 303 as can exist within a network such as the network shown in FIG. 1. As shown in FIG. 3, the switches 301-1 (S1) and 301-2 (S2) include processor and memory resources, 305-1/307-1 and 305-2/307-2 respectively, and logic circuitry associated with a network chip (ASIC), e.g., 309 and 310, each having a number of physical ports, e.g., 311-1, . . . , 313-2, etc. While FIGS. 3-5 are discussed in reference to network switches, one of ordinary skill in the art will appreciate embodiments of the present disclosure are not limited to implementation on network switches, e.g., network management servers and software may benefit from the features described herein.

In the embodiment shown in FIG. 3, a port 311-1 (P1) on a switch 301-1 (S1) has a physical link connection 303, e.g., "brought up" by physical connection, with a port 313-2 (P2) of switch 301-2 (S2). As shown in the example embodiment of FIG. 3, port 311-1 (P1) of switch 301-1 (S1) has been "tagged" with membership in VLAN 1 although switch 301-1 (S1) has been configured with ports configured in membership in VLAN 1 and VLAN 2. As shown in the embodiment of FIG. 3, port 313-2 (P2) of switch 301-2 (S2) has been tagged with membership in VLAN 2 although switch 301-2 (S2) has been configured with ports configured for membership in VLAN 1 and VLAN 2. That is, a first port (P1) on a first network device (S2) has been tagged with membership in a first VLAN, e.g., VLAN 1, and a second port (P2) on a second network device (S2) has been tagged with membership in a second VLAN, e.g., VLAN2, while both switches 301-1 (S1) and 301-2 (S2) have been configured with ports configured for membership in VLAN 1 and VLAN 2. One of ordinary skill in the art will appreciate upon reading this disclosure the manner in which various ports, e.g., port 311-1 (P1) and port 313-2 (P2), associated with a given switch, e.g., switch 301-1 (S1) and switch 301-2 (S2) may be "tagged" with membership in a particular VLAN. For example, a particular port may be tagged with membership in a particular VLAN by execution of software, firmware, and/or user, e.g., network administrator, physical configuration.

Accordingly, embodiments of the present invention include computer executable instructions which may be stored in the memory resource, e.g., 307-1/307-2, of a given switch, e.g., switch 301-1 (S1) and switch 301-2 (S2), or elsewhere, and be executed by the processor resource, e.g., 305-1/305-2, of a switch, e.g., switch 301-1 (S1) and switch 301-2 (S2), or elsewhere, to perform the actions described herein.

According to various embodiments, computer executable instructions are executed such that if when ports 311-1 and 313-2 are "brought up", i.e., get a physical link 303, computer executable instructions are executed to perform error detection for mismatched VLAN tags received to these ports 311-1 and 313-2. In the example embodiment of FIG. 3, port 311-1 (P1) of switch 311-1 (S1) has been tagged on VLAN 1, however, the switch 301-1 has ports configured for VLAN 1 and VLAN 2. Port 311-2 (P2) of switch 311-2 (S2) has been tagged on VLAN 2. Switch 301-2, in this example embodiment, has been configured for VLAN 1 and VLAN 2. As such, computer executable instructions are executed such that if port 311-1 on switch 301-1 receives a packet tagged for VLAN 2, the executed instructions will detect that port 311-1 on switch 301-1 is misconfigured and send an alert signal. In various embodiments the alert signal is sent to a network management program, as the same are known and understood by one of ordinary skill in the art. In effect, the computer executable instructions can execute to receive a packet on port 311-1 of the switch 301-1 and detect that it has a VLAN tag, e.g., VLAN 2, for which port 311-1 has not been configured.

As described above, the number of network ports in a given network device, e.g., switch 301-1, may include a number of ports tagged for a VLAN membership in particular VLANs. A given port may be tagged on a number of VLANs, but untagged on only one VLAN. According to various embodiments, the switch 301-1 can include instructions on the network chip, e.g., 309, that can execute so as not to discard a packet received to port 311-1 which has a VLAN tag associated with a VLAN, e.g., VLAN 2, for which port 311-1 is not tagged with VLAN membership. That is, the instructions on the network chip, e.g., can include instructions provided as part of an application specific integrated circuit (ASIC). In this manner, the computer executable instructions storable in the memory and executable by a processor of switch 301-1 execute to receive a packet on port 311-1 detect that it has a mismatched VLAN tag. In this example, either port 311-1 has been misconfigured to not include tagged membership in VLAN 2, the port sending the packet has been mistakenly provided link to port 311-1 of switch 301-1, or the configuration of the port sending the packet improperly does not match the configuration of port 311-1.

According to various embodiments the computer executable instructions can execute to determine a cause for why port 311-1 has received the packet having the mismatched VLAN tag, e.g., VLAN 2, and send an alert to a network management program. In some embodiments, the network management program can execute instructions to automatically correct a taggedness of a given port in a particular VLAN, e.g., change a tagged membership of port 311-1 in switch 301-1 to include membership in VLAN 2.

According to various embodiments, the computer executable instructions can execute to act on a first packet having a tagged membership to a VLAN for which port 311-1 is not a tagged member to perform the actions described above. Alternatively, according to various embodiments, the computer executable instructions can execute to apply a hashing algorithm to mismatched VLAN tags received to the port 311-1 (also referred to herein as a "first port") in order to detect a trend of received packets tagged for a particular VLAN, e.g., VLAN 2, for which the port 311-1, is not a tagged member. In such embodiment, the computer executable instructions can execute to check a configuration file, e.g., 315-1, storable in memory 307-1 of the switch 301-1 to determine if the particular mismatched VLAN tag, e.g., VLAN 2, is configured on the first network device. In the example embodiment of FIG. 3, both switches 301-1 and switch 301-2 which have physical link 303 provided between port 311-1 and 313-1 have been configured with VLAN membership in VLAN 1 and VLAN 2. As such, computer executable instructions are executed to notify the network management program that a possible misconfiguration has occurred and/or automatically correct the misconfiguration.

FIG. 4 illustrates another embodiment of error detection for mismatched VLAN tags according to this disclosure. The embodiment of FIG. 4 illustrates a pair of switches (S1 and S2), 401-1 and 401-2, respectively, connected via a physical link 403 as can exist within a network such as the network shown in FIG. 1. The switches 401-1 (S1) and 401-2 (S2) include processor and memory resources, 405-1/407-1 and 405-2/407-2 respectively, and logic circuitry associated with a network chip (ASIC), e.g., 409-1, . . . , 409-M and 410-1, . . . , 410-N, each having a number of physical ports, e.g., 411-1, . . . , 413-T, etc. The designators "M" and "N" are used to illustrate that various switches in a network may support or contain different number of chips. Accordingly, various switches in a network may support a different number of ports. Hence, in this example embodiment, switch 401-1 is illustrated having ports 411-1, . . . , 411-P and switch 401-2 is illustrated having ports 413-1, . . . , 413-T. In the embodiment of FIG. 4 the number of switches 401-1 (S1) and 401-2 (S2)

may also include computer executable instructions executable to provide error detection of mismatched VLAN tags according to embodiments of the present disclosure.

In the embodiment shown in FIG. 4, ports 411-1, 411-2, 411-3, and 411-4 on a switch 401-1 (S1) have been given a physical link connection 403, e.g., "brought up" by physical connection, with ports 413-1, 413-2, 413-3, and 413-6 of switch 401-2 (S2). As shown in the example embodiment of FIG. 4, ports 411-1, 411-2, 411-3, and 411-4 of switch 401-1 (S1) have been "tagged" with membership in VLANs 1-2 and untagged membership in VLAN 3 (shown at 412-1). As mentioned above, according to various protocols a port may be tagged with membership in multiple VLANs, but untagged in only one. In the example embodiment of FIG. 4, ports 413-1, 413-2, and 413-3, of switch 401-2 (S2) have been tagged with membership in VLANs 1-2, and untagged in VLAN 3. Port and 413-6 is illustrated as having been tagged with membership in VLAN 5. This is shown collectively at 412-2.

In the example embodiment shown in FIG. 4, when ports 411-1, 411-2, 411-3, 411-4 and 413-1, 413-2, 413-3, and 413-6 are given physical link 403, computer executable instructions are executed to enable error detection of mismatched VLAN tags on these ports. As shown in this example embodiment, ports 411-1, 411-2, 411-3, 411-4 and 413-1, 413-2, 413-3, and 413-6 are either tagged, e.g., VLANs 1-2 and VLAN 5, or untagged, e.g., VLAN 3, as members of particular VLANs. Hence ports 411-1, 411-2, 411-3, 411-4 and 413-1, 413-2, 413-3, and 413-6 may be a tagged member of multiple VLANs and a member of one untagged VLAN.

The embodiment of FIG. 4 is useful in illustrating that, according to embodiment computer executable instructions are execute to determine whether the packet is intended to be untagged on a different VLAN than the taggedness of a recipient port, e.g., port 413-6. For example, when a mismatched VLAN tag is associated with an untagged packet, e.g., a packet untagged on VLAN 3, is received at port 413-6 which is not untagged in association with any VLAN but is tagged with membership in VLAN 5, the computer executable instructions can execute at level 2 of a TCP/IP protocol stack determine whether the packet is intended to be untagged on a VLAN 5 matching the taggedness of port 413-6. Or, alternatively, the computer executable instruction can execute alert a network management program that a misconfiguration has occurred. For example, as in the embodiment of FIG. 4, if a packet is untagged and port 413-1 is not an untagged member of a VLAN then computer executable instructions are executed to identify a mismatched VLAN tag. Either the network is misconfigured to send packets to switch 401-2 (S2) without a VLAN tag, or switch 401-2 is misconfigured with respect to its VLAN 5 taggedness.

As described above, in the case where an untagged packet is received on port 413-1 of switch 401-3, computer executable instructions are executed to determine whether the packet is really intended to be untagged on VLAN5 or if the untagged packet is intended to be untagged on some other VLAN, e.g., VLAN 3. According to various embodiments the computer executable instructions can execute to determine whether the packet is really intended to be untagged on VLAN5 or if the untagged packet is intended to be untagged on some other VLAN, e.g., that port 413-6 should be have untagged membership in VLAN 3.

FIG. 5 illustrates another embodiment of error detection for mismatched VLAN tags according to this disclosure. As illustrated in the embodiment of FIG. 5, a pair of switches (S1 and S2), 501-1 and 501-2, respectively, connected via a physical link 503 as can exist within a network such as the network shown in FIG. 1. The switches 501-1 (S1) and 501-2 (S2) include processor and memory resources, 505-1/507-1 and 505-2/507-2 respectively, and logic circuitry associated with a network chip (ASIC), e.g., 509-1, . . . , 509-M and 510-1, . . . , 510-N, each having a number of physical ports, e.g., 511-1, . . . , 513-T, etc. Again, the designators "M" and "N" are used to illustrate that various switches in a network may support or contain different number of chips. Accordingly, various switches in a network may support a different number of ports. Hence, in this example embodiment, switch 501-1 is illustrated having ports 511-1, . . . , 511-P and switch 501-2 is illustrated having ports 513-1, . . . , 513-T. In the embodiment of FIG. 5 the number of switches 501-1 (S1) and 501-2 (S2) may also include computer executable instructions executable to provide error detection of mismatched VLAN tags according to embodiments of the present disclosure.

In the embodiment shown in FIG. 5, ports 511-1, 511-2, 511-3, and 511-4 on a switch 501-1 (S1) have been given a physical link connection 503, e.g., "brought up" by physical connection, with ports 513-1, 513-2, 513-3, and 513-6 of switch 501-2 (S2). As shown in the example embodiment of FIG. 5, ports 511-1, 511-2, 511-3, and 511-4 of switch 501-1 (S1) have been "tagged" with membership in VLANs 1-5 (shown at 512-1). As mentioned above, according to various protocols a port may be tagged with membership in multiple VLANs, but untagged in only one. In the example embodiment of FIG. 5, ports 513-1, 513-2, 513-3, and 513-6 of switch 501-2 (S2) have been tagged with membership in VLANs 1-4, and untagged with membership in VLAN 5. This is shown collectively at 512-2.

In the example embodiment shown in FIG. 5, when ports 511-1, 511-2, 511-3, 511-4 and 513-1, 513-2, 513-3, and 513-6 are given physical link 503, computer executable instructions are executed to enable error detection of mismatched VLAN tags on these ports. As shown in this example embodiment, ports 511-1, 511-2, 511-3, 511-4 have been tagged for membership in VLANs 1-5. Ports 513-1, 513-2, 513-3, and 513-6 have been tagged for membership in VLANs 14, and untagged for membership in another VLAN, e.g., VLAN 5. Hence ports 511-1, 511-2, 511-3, 511-5 and 513-1, 513-2, 513-3, and 513-6 may be a tagged member of multiple VLANs and a member of one untagged VLAN.

The embodiment of FIG. 5 is useful in illustrating that, according to embodiments, computer executable instructions are execute to determine whether the packet is intended to be untagged on a different VLAN than the taggedness of a recipient port. For example, computer executable instructions are executed such that when ports 513-1, 513-2, 513-3, and 513-6 of switch 501-2 send an untagged packet to ports 511-1, 511-1, 511-3, and 511-4 of switch 501-1 a mismatched VLAN tag is associated with the untagged packet and actions can be performed as the same have been described herein. Likewise, if a packet tagged for VLAN 5 is sent to ports 513-1, 513-2, 513-3, and 513-6 of switch 501-2 a mismatched VLAN tag is associated with the tagged packet for VLAN 5 on ports 513-1, 513-2, 513-3, and 513-6 of switch 501-2 and actions can be performed as the same have been described herein. As such, embodiments of the present invention are not dependent on another network device in a network including the computer executable instructions embodiments described herein when one particular network device includes the computer executable instructions described herein, for detecting that a packet received to one of its ports has a mismatched VLAN tag, is attached as part of a network.

As the reader will appreciate, packets tagged for VLANs 14 exchanged between ports 511-1, 511-1, 511-3, and 5114 of switch 501-1 and ports 513-1, 513-2, 513-3, and 513-6 of switch 501-2 will not detect a mismatched VLAN tag. As such, according to some embodiments, computer executable instructions can be executed to share port and VLAN tagging information through a packet based protocol to further identify mismatched VLAN tags. Embodiments, however, are not so limited.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
   a processor;
   a memory in communication with the processor;
   a network chip having a number of network ports for the device and having access to the processor and memory, wherein a port of the network ports is tagged for a VLAN membership of at least one particular VLAN, and configured to receive at least one packet; and
   computer executable instructions storable in the memory and executable by the processor to detect whether the packet received at the port is untagged with any VLAN,
   wherein upon detecting that the packet is untagged with any VLAN, the computer executable instructions determine whether the untagged packet is intended to be untagged on the at least one particular VLAN at the port; and
   wherein upon determining that the packet is not intended to be untagged on the at least one particular VLAN, the computer executable instructions send a misconfiguration alert signal to a network management program, and determine either the packet is misconfigured to be sent to the network chip without a VLAN tag or the port of the network chip is misconfigured to be tagged with the at least one particular VLAN.

2. The network device of claim 1, wherein the computer executable instructions can execute to receive a packet on the port of the device and detect that it has a VLAN tag for which the port has not been configured.

3. The network device of claim 2, the number of network ports includes a number of ports tagged for a VLAN membership in particular VLANs, wherein the port is tagged on the particular VLANs, but untagged on only one VLAN.

4. The network device of claim 3, wherein the device can include instructions on the network chip that can execute so as not to discard a packet received at the port of the network chip which has a VLAN tag associated with a VLAN for which the port is not tagged with VLAN membership.

5. The network device of claim 4, wherein the instructions on the network chip includes instructions provided as part of an application specific integrated circuit (ASIC).

6. A network device, comprising:
   a processor;
   a memory in communication with the processor;
   a network chip having a number of network ports for the device and having access to the processor and memory, number of the network ports being tagged for a VLAN membership in particular VLANs, wherein a port of the network ports is tagged on the particular VLANs, but untagged on only one VLAN, and wherein the network chip includes hardware that can execute logic so as not to discard a packet received at the port of the network chip having a mismatched VLAN tag; and
   computer executable instructions storable in the memory and executable by the processor to receive a packet on the port of the network chip and detect that it has a mismatched VLAN tag,
   wherein when the packet received at the port is untagged with any VLAN, the computer executable instructions determine whether the untagged packet is intended to be untagged on a VLAN matching one of the particular VLANs at the port; and
   wherein upon determining that the packet is not intended to be untagged on the particular VLANs, the computer executable instructions send a misconfiguration alert signal to a network management program, and determine either the packet is misconfigured to be sent to the network chip without a VLAN tag or the tag at the port of the network chip is misconfigured.

7. The network device of claim 6, wherein the computer executable instructions can execute to determine a cause for why the port has received the packet having the mismatched VLAN tag.

8. The network device of claim 6, wherein the network management program can execute instructions to automatically correct a VLAN tag at the port.

9. The network device of claim 6, wherein, when the mismatched VLAN tag is associated with an untagged packet, the computer executable instructions can execute at level 2 of a TCP/IP protocol stack.

10. The network device of claim 7, wherein, when the mismatched VLAN tag is associated with an untagged packet, the computer executable instructions can execute at level 2 of a TCP/IP protocol stack.

11. A computer readable storage device having executable instructions which can be executed by a processor to cause a network device to perform a method, comprising:
   configuring a first port on a first network device as a tagged port with membership in a first virtual local area network (VLAN);
   establishing a physical link between the first port on the first network device and a second port on a second network device; and
   detecting that a packet received to the first port of the first network device has a mismatched VLAN tag,
   wherein when the packet received at the first port is untagged with any VLAN, the computer executable instructions determine whether the untagged packet is intended to be untagged on the first VLAN at the first port; and wherein upon determining that the packet is not intended to be untagged on the first VLAN, the computer executable instructions send a misconfiguration alert signal to a network management program, and determine either the packet is misconfigured to be sent to the first network device without a VLAN tag or the first port of the first network device is misconfigured to be tagged with the first VLAN.

12. The medium of claim 11, wherein the method includes executing instructions to:
apply a hashing algorithm to mismatched VLAN tags received to the first port in order to detect a trend of received packets tagged for a particular VLAN for which the first port is not tagged; and
check a configuration file on the first network device to determine if the particular VLAN is configured on the first network device.

13. The medium of claim 11, wherein the method includes:
receiving a packet to the first port wherein the packet is an untagged member of a VLAN for which the first port is a tagged member; and
determining whether the untagged packet is intended to be untagged on a different VLAN for which the first port is an untagged member.

14. The medium of claim 13, wherein the computer executable instructions can be executed can execute at level 2 of a TCP/IP protocol stack.

15. The medium of claim 11, wherein the method includes receiving a packet tagged for membership in a second VLAN when the first port is not tagged for membership in the second VLAN.

16. The medium of claim 11, wherein the network device is part of a network and wherein detecting that a packet received to the first port of the first device has a mismatched VLAN tag is not dependent on another network device in the network including the computer executable instructions.

17. The medium of claim 11, wherein the computer executable instruction can be executed to share port and VLAN tagging through a packet based protocol.

* * * * *

UNITED STATES PATENT AND TRADEMARK OFFICE
CERTIFICATE OF CORRECTION

PATENT NO. : 7,796,613 B2
APPLICATION NO. : 11/590309
DATED : September 14, 2010
INVENTOR(S) : Shaun C. Wackerly It is certified that error appears in the above-identified patent and that said Letters Patent is hereby corrected as shown below:

In the Claims:

In column 12, line 5, in Claim 14, after "instructions" delete "can be executed".

Signed and Sealed this
Twenty-third Day of April, 2013

Teresa Stanek Rea
*Acting Director of the United States Patent and Trademark Office*